(12) United States Patent
Isomura et al.

(10) Patent No.: US 7,908,547 B2
(45) Date of Patent: Mar. 15, 2011

(54) ALBUM CREATING APPARATUS, ALBUM CREATING METHOD AND PROGRAM

(75) Inventors: Ayumu Isomura, Tokyo (JP); Shuji Ono, Kanagawa (JP); Akira Yoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1354 days.

(21) Appl. No.: 11/410,978

(22) Filed: Apr. 26, 2006

(65) Prior Publication Data

US 2006/0244765 A1    Nov. 2, 2006

(30) Foreign Application Priority Data

Apr. 28, 2005 (JP) ................................ 2005-133257
Mar. 14, 2006 (JP) ................................ 2006-069991

(51) Int. Cl.
G06F 17/20 (2006.01)
(52) U.S. Cl. ...................................................... 715/204
(58) Field of Classification Search .................... 715/204
See application file for complete search history.

(56) References Cited

U.S. PATENT DOCUMENTS

| | | | | |
|---|---|---|---|---|
| 5,563,722 | A * | 10/1996 | Norris | 358/453 |
| 6,324,545 | B1 * | 11/2001 | Morag | 707/202 |
| 6,567,983 | B1 * | 5/2003 | Shiimori | 725/105 |
| 7,148,990 | B2 * | 12/2006 | Atkins et al. | 358/1.18 |
| 7,474,801 | B2 * | 1/2009 | Teo et al. | 382/284 |
| 7,555,730 | B2 * | 6/2009 | Atkins | 715/853 |
| 7,640,516 | B2 * | 12/2009 | Atkins | 715/853 |
| 7,644,356 | B2 * | 1/2010 | Atkins et al. | 715/243 |
| 7,656,543 | B2 * | 2/2010 | Atkins | 358/1.13 |
| 7,668,400 | B2 * | 2/2010 | Widdowson et al. | 382/276 |
| 7,715,586 | B2 * | 5/2010 | Issa et al. | 382/100 |
| 7,743,322 | B2 * | 6/2010 | Atkins | 715/243 |
| 2001/0048475 | A1 * | 12/2001 | Shiomi | 348/208 |
| 2002/0070982 | A1 * | 6/2002 | Hill et al. | 345/835 |
| 2002/0122067 | A1 * | 9/2002 | Geigel et al. | 345/788 |
| 2003/0072486 | A1 * | 4/2003 | Loui et al. | 382/175 |

(Continued)

FOREIGN PATENT DOCUMENTS

JP    10-126731 A    5/1998

OTHER PUBLICATIONS

Title: Automatic Page layout Using Genetic Algorithms for Electronic Albuming, Author: Joe Geigel et al. Date: 2001, URL:<http://www.jogle.com/Research/publications/spieFin>.*

(Continued)

*Primary Examiner* — Doug Hutton
*Assistant Examiner* — Mustafa Amin
(74) *Attorney, Agent, or Firm* — Sughrue Mion, PLLC

(57) ABSTRACT

An album creating apparatus for automatically designing image frames depending on the kind of subjects is provided. The album creating apparatus includes: an image storage section for storing a plurality of images; an image layout section for laying out the images stored in the image storage section into an album; an amount of designing determining section for determining the amount of designing in the album depending on the kind of object included in the image laid out in the album by the image layout section; and a designing section for designing such that the larger the amount of designing determined by the amount of designing determining section, the more the designing section transforms from a rectangle the frame shape of the image laid out in the album by the image layout section.

12 Claims, 10 Drawing Sheets

U.S. PATENT DOCUMENTS

| | | | |
|---|---|---|---|
| 2003/0115286 A1* | 6/2003 | Mayle et al. | 709/217 |
| 2004/0028290 A1* | 2/2004 | Gamble | 382/284 |
| 2004/0109587 A1* | 6/2004 | Segawa et al. | 382/115 |
| 2005/0071781 A1* | 3/2005 | Atkins | 715/838 |
| 2005/0071783 A1* | 3/2005 | Atkins | 715/851 |
| 2005/0111737 A1* | 5/2005 | Das et al. | 382/190 |
| 2005/0157343 A1* | 7/2005 | Tani et al. | 358/1.18 |
| 2005/0278111 A1* | 12/2005 | Ujino | 701/200 |
| 2006/0074923 A1* | 4/2006 | Gower et al. | 707/100 |
| 2006/0103891 A1* | 5/2006 | Atkins | 358/450 |
| 2006/0158463 A1* | 7/2006 | Michlin | 345/634 |
| 2006/0177194 A1* | 8/2006 | King et al. | 386/46 |
| 2006/0181546 A1* | 8/2006 | Jung et al. | 345/619 |
| 2006/0200758 A1* | 9/2006 | Atkins | 715/517 |
| 2006/0279566 A1* | 12/2006 | Atkins et al. | 345/418 |
| 2007/0008321 A1* | 1/2007 | Gallagher et al. | 345/473 |

OTHER PUBLICATIONS

Title: Graphic Object Layout With Interactive Genetic Algorithms, Authors: Toshiuki Masui et al. Date: 1992, URL:<http://www.sonycsl.co.jp/person/masui/papers/VL92/>.*

* cited by examiner

382

| CONTENT OF TEXT | AMOUNT OF DESIGNING |
|---|---|
| GACK | AMOUNT OF DESIGNING 1 |
| SMOOTHLY | AMOUNT OF DESIGNING 2 |
| -CHAN | AMOUNT OF DESIGNING 3 |
| ⋮ | ⋮ |

FIG. 8

ALBUM CREATING APPARATUS, ALBUM CREATING METHOD AND PROGRAM

CROSS REFERENCE TO RELATED APPLICATION

The present application claims priority from Japanese Patent Applications Nos. JP 2005-133257 filed on Apr. 28, 2005 and JP 2006-069991 filed on Mar. 14, 2006, the contents of which are incorporated herein by reference.

BACKGROUND OF THE INVENTION

1. Field of the Invention

The present invention relates to an album creating apparatus, an album creating method, and a program. Particularly, the present invention relates to an album creating apparatus and an album creating method for creating an album, and a program for the album creating apparatus.

2. Related Art

Conventionally, a technology for creating an album has been known that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 10-126731.

However, a technology for creating an album by designing an image depending on the kind of subjects in the image has not been disclosed in the above-described conventional art. For example, when the subject is a cute object such as a child and a puppy, the frame shape of the image is formed with a curvature so that the cuteness of the subject can be appropriately expressed to the viewer. Additionally, when the subject person is in high sprits, the image frame shape is formed with a curvature so that the joyful atmosphere can be expressed to the viewer. In this case, however, if the album creator has to check the content of the image and transform the image frame shape, it is not preferred because it takes a lot of trouble.

SUMMARY OF THE INVENTION

Thus, it is an object of the present invention to provide an album creating apparatus, an album creating method and a program which are capable of solving the problem accompanying the conventional art. The above and other objects can be achieved by combining the features recited in independent claims. Then, dependent claims define further effective specific example of the present invention.

A first aspect of the present invention provides an album creating apparatus. The album creating apparatus includes: an image storage section for storing a plurality of images; an image layout section for laying out the images stored in the image storage section into an album; an amount of designing determining section for determining the amount of designing in the album depending on the kind of object included in the image laid out in the album by the image layout section; and a designing section for designing the frame shape of the image laid out in the album by the image layout section in association with the amount of designing determined by the amount of designing determining section.

The larger the amount of designing determined by the amount of designing determining section, the more the designing section may transform from a rectangle the frame shape of the image laid out in the album by the image layout section.

The album creating apparatus further includes a moving image information storage section for storing at least one of moving information before the image is captured or moving information after the image is captured in association with each of the plurality of images stored in the image storage section, and an object movement calculating section for calculating the movement of an object included in the image laid out in the album by the image layout section based on the moving information stored in the moving information storage section. The amount of designing determining section may determine the amount of designing according to the movement of the object calculated by the object movement calculating section.

The amount of designing determining section may determine that the amount of designing of the album is larger when the frequency of the movement of the object calculated by the object movement calculating section is higher.

The album creating apparatus further includes a sound storage section for storing the sound captured along with the image in association with each of the plurality of images stored in the image storage section. The amount of designing determining section may determine the amount of designing of the album depending on the kind of object included in the image laid out in the album by the image layout section.

The amount of designing determining section may determine that the amount of designing of the album is larger when the frequency of the sound stored in the sound storage section is higher.

The album creating apparatus further includes an amount of designing storage section for storing the amount of designing in association with the kind of object, and an object identifying section for identifying the kind of the object included in the image laid out in the album by the image layout section. The amount of designing determining section may select the amount of designing stored in the amount of designing storage section in association with the kind of the object identified by the object identifying section. The designing section may design the frame shape of the image laid out in the album by the image layout section in association with the amount of designing selected by the amount of designing determining section.

The album creating apparatus further includes an album template storage section for storing a plurality of album templates in which the layout of the plurality of images in the album is defined, and an album template selecting section for selecting one album template among the plurality of album templates stored in the album template storage section. The image layout section may lay out the images stored in the image storage section based on the album template selected by the album template selecting section. The designing section may design the frame shape of the image laid out in the album by the image layout section in association with the amount of designing determined by the amount of designing determining section.

The album creating apparatus further includes an image quality judgment section for judging the quality of the image laid out in the album by the image layout section. The amount of designing determining section may determine that the amount of designing of the album is larger when the image quality calculated by the image quality judgment section is lower.

The album creating apparatus further includes a text acquiring section for acquiring a text used for the album. The amount of designing determining section may determine the amount of designing of the album based on the content of the text acquired by the text acquiring section. Additionally, the album creating apparatus further includes the amount of designing storage section for storing the amount of designing in association with the content of the text. The amount of designing determining section may select the amount of designing stored in the amount of designing storage section in association with the content of the text acquired by the text acquiring section.

The designing section may increase the variation of the areas for the plurality of image frames laid out in the album by the image layout section when the amount of designing determined by the amount of designing determining section is larger. Additionally, the larger the amount of designing determined by the amount of designing determining section, the more the designing section may increase the variation of the slope of the plurality of image frames laid out in the album by the image layout section.

The larger the amount of designing determined by the amount of designing determining section, the more the designing section may increase the amount of change of the color of the image laid out in the album by the image layout section. Additionally, the larger the amount of designing determined by the amount of designing determining section, the more the designing section may select decorated characters as the text laid out in the album.

The album creating apparatus may create album data to continuously display a plurality of images. The image layout section may lay out images such that the same image is displayed on the different positions at the continuous display timings. Additionally, the larger the amount of designing determined by the amount of designing determining section, the more the designing section may increase the acceleration regarding the position of the same image laid out in order to display on the different positions at the continuous display timings.

The amount of designing determining section may calculate an amount of designing vector composed of the amount of designing for each kind of the plurality of designing in each of the continuous pages in the album and determine the amount of designing vector for each of the continuous pages such that the amount of change in the direction of the amount of designing vector calculated in the continuous pages is less than the predetermined amount of change.

A second aspect of the present invention provides an album creating method. The album creating method includes the steps of: storing a plurality of images; laying out the images stored in the image storage step into an album; determining the amount of designing in the album depending on the kind of object included in the image laid out in the album in the image laying out step; and designing the frame shape of the image laid out in the album in the image laying out step in association with the amount of designing determined by the amount of designing determining step.

A third aspect of the present invention provides a program for an album creating apparatus for creating an album. The program operates the album creating apparatus to function as: an image storage section for storing a plurality of images; an image layout section for laying out the images stored in the image storage section into an album; an amount of designing determining section for determining the amount of designing in the album depending on the kind of object included in the image laid out in the album by the image layout section; and a designing section for designing the frame shape of the image laid out in the album by the image layout section in association with the amount of designing determined by the amount of designing determining section.

A fourth aspect of the present invention provides an album creating apparatus. The album creating apparatus includes: an image storage section for storing a plurality of images; an image layout section for laying out the images stored in the image storage section into an album; an image quality judgment section for judging the quality of the image laid out in the album by the image layout section; an amount of designing determining section for determining that the amount of designing of the album is larger when the image quality calculated by the image quality judgment section is lower; and a designing section for designing the image laid out in the album by the image layout section in association with the amount of designing determined by the amount of designing determining section.

A fifth aspect of the present invention provides an image creating method. The image creating method includes the steps of: storing a plurality of images; laying out the images stored in the image storing step into an album; judging the quality of the image laid out in the album in the image laying out step; determining that the amount of designing of the album is larger when the image quality calculated in the image quality judging step is lower; and designing the image laid out in the album in the image laying out step in association with the amount of designing determined in the amount of designing determining step.

A sixth aspect of the present invention provides a program for an album creating apparatus for creating an album. The program operates the album creating apparatus to function as: an image layout section for laying out the images stored in the image storage section into an album; an image quality judgment section for judging the quality of the image laid out in the album by the image layout section; an amount of designing determining section for determining that the amount of designing of the album is larger when the image quality calculated by the image quality judgment section is lower; and a designing section for designing the image laid out in the album by the image layout section in association with the amount of designing determined by the amount of designing determining section.

Here, all necessary features of the present invention are not listed in the summary of the invention. The sub-combinations of the features may become the invention.

According to the present invention, an album creating apparatus for automatically designing the frame shape of the image depending on the kind of subjects can be provided.

BRIEF DESCRIPTION OF THE DRAWINGS

FIG. 8 shows an example of the amount of designing stored in an amount of designing storage section 382;

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
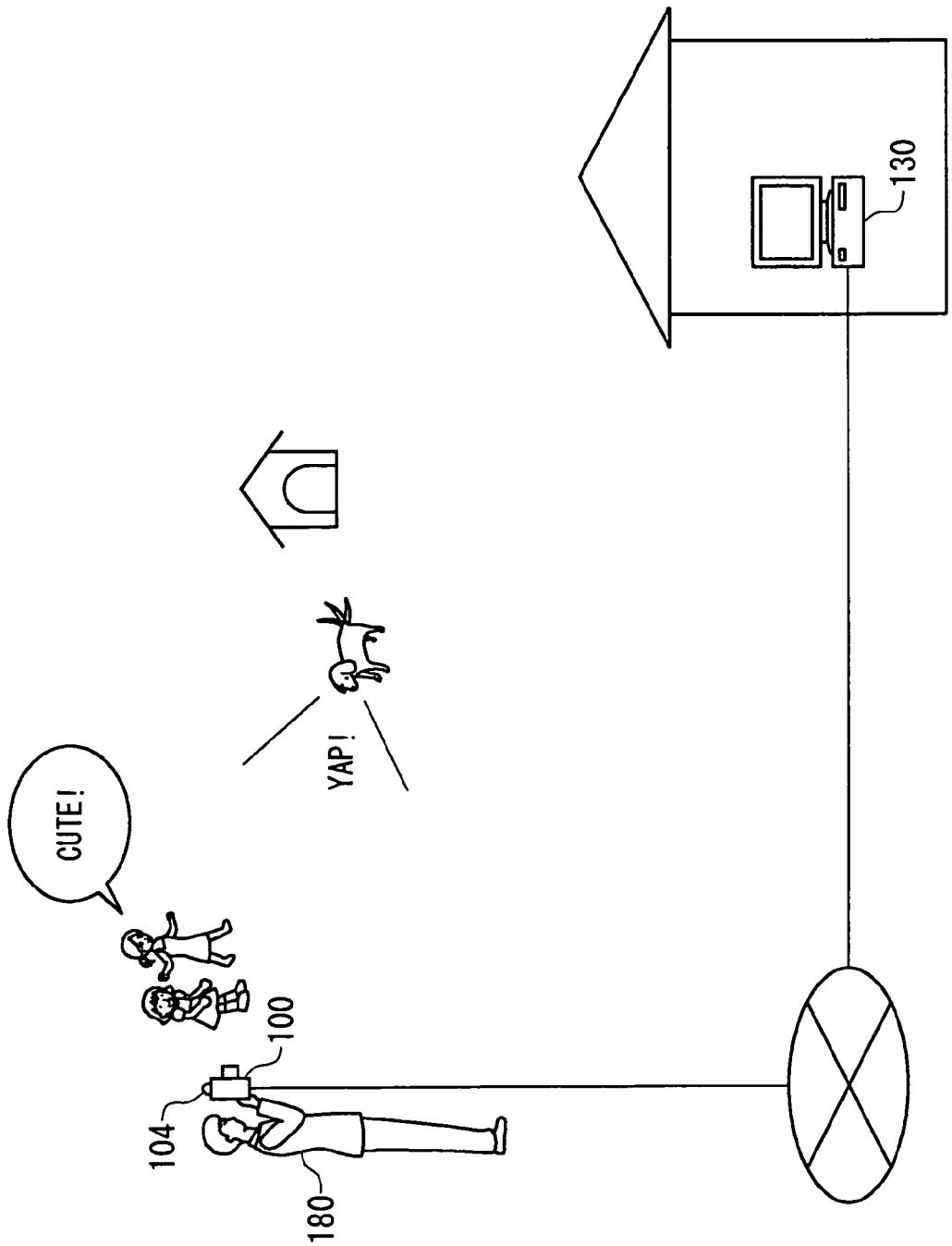
FIG. 1 shows an example of the environment for the usage of an album creating system.

FIG. 1 shows an example of the environment for the usage of an album creating system 170 according to an embodiment of the present invention. The album creating system 170 includes an image, capturing apparatus 100 and an album creating apparatus 130. The image capturing apparatus 100 captures a subject according to an instruction by a user 180. At this time, the image capturing apparatus 100 collects the sound surrounding the image capturing apparatus 100 by a sound collecting section 104 and records the same during recording a moving image of the subject in association with the captured image.

The album creating apparatus 130 receives the images captured by the image capturing apparatus 100 along with the sound and the moving image through a communication line 150 such as Internet and a recording medium such as a semiconductor memory. Then, the album creating apparatus 130 lays out the images into each page of the album. Then, the album creating apparatus 130 judges the kind of subject of the image received from the image capturing apparatus 100. Then, the album creating apparatus 130 set the amount of transformation of the shape of the image frame into which the image is fitted depending on the kind of subject. For example, when the image of a puppy is fitted into the image frame, the rectangular image frame is transformed with curvature to make the image frame round.

Additionally, the album crating apparatus 130 detects the frequency component of the movement of the subject from the moving image acquired by the image capturing apparatus 100, and sets the amount of transformation of the shape of the image frame larger when higher frequency component is detected. Additionally, the album creating apparatus 130 detects the frequency component of the sound surrounding the image capturing apparatus 100 from the sound data acquired by the image capturing apparatus 100, and sets the amount of transformation of the shape of the image frame further larger when higher frequency component is detected. Then, the album creating apparatus 130 transforms the image frame depending on the set amount of transformation. Then, the album creating apparatus 130 outputs the generated album data to an external output device such as a display and a printer.

Here, the album creating apparatus 130 may be a personal computer, an electronic album, an electronic photo-stand and a HDTV. Additionally, the image capturing apparatus 100 may be a digital still camera and a video camera, and also may be a camera cell-phone and a hand-held terminal having an image-capturing function such as a PDA.

Images are broadly classified into information images and emotional images depending on the kind of subjects. For example, the image on which a puppy is shown is an emotional image because the image causes the viewer to feel cute. Alternatively, the image on which an office building is shown is an information image because the image reminds the viewer of the description of business. In the album creating system 170 according to the present embodiment, the album creating apparatus 130 transforms the image frame into which the image of a puppy is fitted to the rounded image frame, so that the emotional scene can be accurately expressed to the viewer. Additionally, when the subject is an office building, the album creating apparatus 130 does not transform the image frame into which the office building is fitted but remains the rectangle, so that the informational content can be expressed to the viewer.

Additionally, the album creating apparatus 130 can increase/reduce the amount of transformation depending on the sound and the movement of subject captured by the image capturing apparatus 100. Therefore, the user 180 can easily obtain the album in which the scene of the subject is appropriately expressed.

Figure 2:
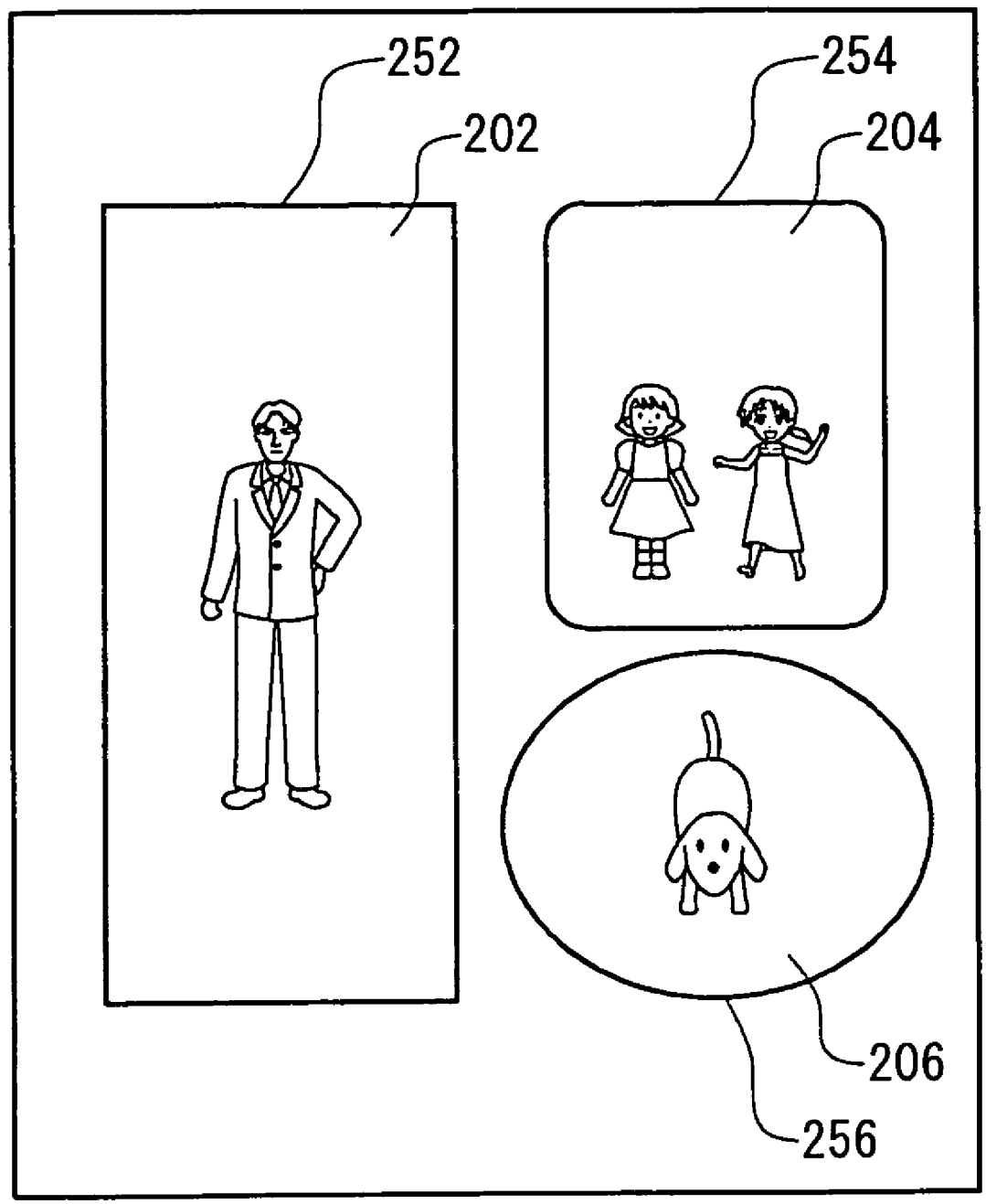
FIG. 2 shows an example of an output by the album creating system.

FIG. 2 shows an example of the result of designing by the album creating apparatus 130. One page of the album in which an image 202, an image 204 and an image 206 are laid out is shown in FIG. 2. The album creating apparatus 130 does not transform an image frame 254 into which an image of which subject who is an adult male is fitted, but remains the rectangle. Meanwhile the image creating apparatus 130 transforms a rectangular image frame 254 into which an image of which subject is a child is fitted and a rectangular image frame 256 into which an image of which subject is a puppy is fitted to enhance the cuteness. Therefore, the album creating apparatus 130 can harmonize the impression received by the user from the subject of the image with the impression received by the user from the image frame.

Here, the album creating apparatus 130 may include a template in which the layout of images in the album is defined. For example in FIG. 2, a plurality of image frames (252, 254 and 256) in which the position and the size to fit each image is defined as the template. Then, the album creating apparatus 130 may create the album by fitting the image into each image frame. Then, the album creating apparatus 130 may have a parameter to define the shape of the image frame and change the parameter based on the amount of transformation to design the shape of the image frame.

Figure 3:
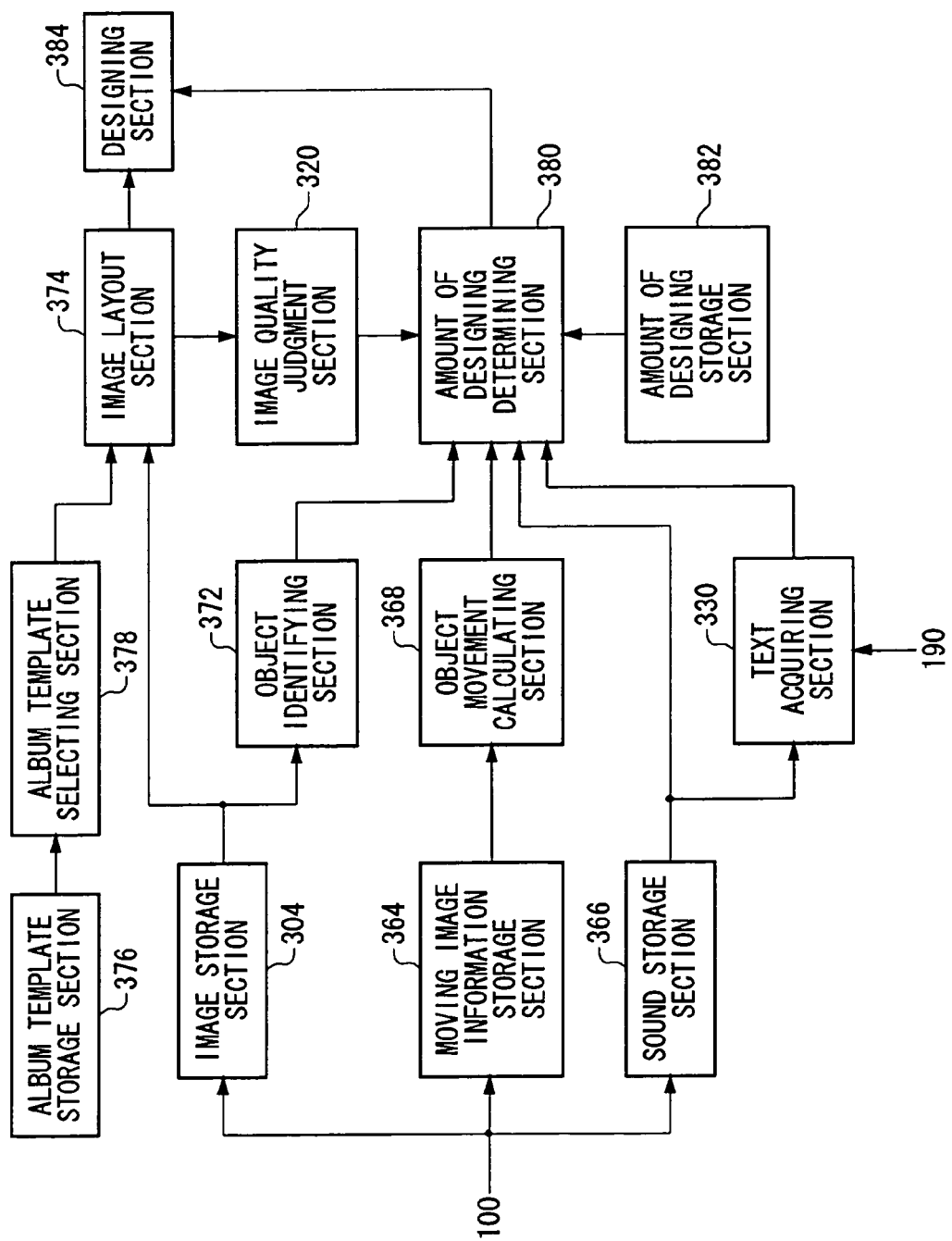
FIG. 3 is an example of a block configuration of an album creating apparatus 130.

FIG. 3 is an example of a block configuration of the album creating apparatus 130. The album creating apparatus 130 includes an image storage section 304, a moving image information storage section 364, a sound storage section 366, an object movement calculating section 368, an object identifying section 372, an image layout section 374, an album template storage section 376, an album template selecting section 378, an amount of designing determining section 380, an amount of designing storage section 382, designing section 384, image quality judgment section 320 and a text acquiring section 330.

The image storage section 304 stores a plurality of images. Specifically, the image storage section 304 acquires the plurality of images captured by the image capturing apparatus 100 and stores the same.

The image layout section 374 lays out the images stored in the image storage section 304 into the album. Then, the amount of designing determining section 380 determines the amount of designing of the album depending on the kind of object included in the image laid out by the image layout section 374.

The designing section 384 designs the frame shape of the image laid out in the album by the image layout section 374 in association with the amount of designing determined by the amount of designing determining section 380. Specifically, the larger the amount of designing determined by the amount of designing determining section 130, the more the designing section 384 transforms from a rectangle the frame shape of the image laid out in the album by the image layout section 374. Therefore, the album creating apparatus 130 can automatically design the image frame for each kind of the subjects in response to the impression on the viewer.

Here, the amount of designing may be an index indicative of the circularity of the image frame and the amount of the average curvature in the image frame. Additionally, the amount of designing may be an index indicative of the ratio of the transformed area to the rectangular image frame and the number of edges of the image frame.

The amount of designing storage section 382 stores the amount of designing in association with the kind of objects. The object identifying section 372 identifies the kind of the object included in the image laid out in the image by the image layout section 274. For example, the object identifying section 372 extracts the outline of an object included in the image laid out in the album by the image layout section 374 by an edge extraction and compares the extracted outline of object with the outline of object previously determined for each kind of object.

Then, the amount of designing determining section 380 may select the amount of designing stored in the amount of designing storage section 382 in association with the kind of object identified by the object identifying section 372. Then, the designing section 384 may design the frame shape of the image laid out in the album by the image layout section 374 in association with the amount of designing selected by the amount of designing determining section 380. Therefore, the album creating apparatus 130 can appropriately design depending on the kind of the subject.

Here, the amount of designing storage section 382 may acquire the amount of designing for each object from the outside of the album creating apparatus 130. For example, the amount of designing storage section 382 may acquire the amount of designing for each object from the communication line 150 such as Internet and a recording medium such as a CD-ROM and a semiconductor memory.

The object identifying section 372 may preferentially select an object of which size is larger as the object of which kind should be identified among the objects included in the image laid out in the album by the image layout section 374. Additionally, the object identifying section 372 may preferentially select the object laid out in more central image region as the object of which kind should be identified among the objects included in the image laid out in the album by the image layout section 374, and also may preferentially select the object laid out in the image region closer to the focus position.

The moving image information storage section 364 stores at least one of the moving image information before the image is captured or the moving image after the image is captured in association with each of the plurality of images stored in the image storage section 304. Specifically, the moving information storage section 364 acquires moving image data associated with the plurality of images captured by the image capturing apparatus 100 and stores the same.

The movement calculating section 368 calculates the movement of the object included in the image laid out in the album by the image layout section 374 based on the moving image information stored in the moving information storage section 364. Then, the amount of designing determining section 380 determines the amount of designing of the album based on the movement of the object calculated by the object movement calculating section 368. Specifically, the amount of designing determining section 380 determines that the amount of designing of the album is larger when the frequency of the movement of the object calculated by the object movement calculating section 368 is higher. Thereby the album creating apparatus 130 can automatically design the image frame based on the characteristic of the movement of the subject.

The sound storage section 366 stores the sound captured along with the image in association with each of the plurality of images stored in the image storage section 304. Specifically, the sound storage section 366 acquires the sound recorded by the image capturing section 100 and stores the same. Then, the amount of designing determining section 380 determines the amount of designing in the album depending on the kind of the object included in the image laid out in the album by the image layout section 374. Specifically, the amount of designing determining section 380 determines that the amount of designing of the album is larger when the frequency of the sound stored in the sound storage section 366 is higher.

The album template storage section 376 stores a plurality of album templates to define the layout of a plurality of images in the album. The album template selecting section 378 selects one album template among the plurality of album templates stored in the album template storage section 376. Here, the album template selecting section 378 may select the template of the album according to an instruction by the user 180.

In this case, the image layout section 374 lays out the images stored in the image storage section 304 based on the album template selected by the album template selecting section 378. Here, the image layout section 374 may determine the image to be laid out in the album template according to an instruction by the user 180. Then, the designing section 384 designs the frame shape of the image laid out in the album template by the image layout section 374 in association with the amount of designing determined by the amount of designing determining section 380. Therefore, the album creating apparatus 130 can create the album only by adapting the image to the template and transforming the frame shape of the template, so that the album can be more speedily outputted.

Here, the designing section 384 more increases the variation of the area for the plurality of image frames laid out in the album by the image layout section 374 when the amount of designing determined by the amount of designing determining section 380 is larger. Additionally, the larger the amount of designing determined by the amount of designing determining section 380, the more the designing section 384 may increase the variation of the slope of the frames of the plurality of images laid out in the album by the image layout section 374. Further, the larger the amount of designing determined by the amount of designing determining section 380, the more the designing section 384 selects decorated characters as the text laid out in the album.

Additionally, the designing section 384 increases the amount of change of the color of the image laid out in the album by the image layout section 374 when the amount of designing determined by the amount of designing determining section 380 is larger. For example, the designing section 384 may increase the throughput of an effect given to the image when the amount of designing determined by the amount of designing determined by the amount of designing determining section 380 is larger. Here, the throughput may be the amount of change of such as color and luminance. The amount of change of color and luminance may be a value based on the number of changed colors, the amount of difference between the changed colors and the amount of changed luminance. Additionally, the designing section 384 may increase the throughput of the trimming (e.g. the amount of change of the area) and the decoration level of the image (e.g. the number of decorated image laid out in the image and the area of the decorated image).

In the case that the album creating apparatus 130 creates album data to continuously display a plurality of images such as a slide show, the larger the amount of designing determined by the amount of designing determining section 380, the more the designing section 384 increases the acceleration regarding the position of the same image laid out by the image layout section 374 in order to display on the different positions at the continuous display timings.

The amount of designing determining section 380 calculates the amount of designing vector composed of the amount of designing for each of the plural kinds of designing in each of the continuous pages in the album and determines each of the amount of designing vectors in the continuous pages such that the amount of change in the direction of the amount of designing calculated in the continuous pages is less than the predetermined amount of change. Therefore, the album creating apparatus 130 can previously prevent from creating an album in which the direction of designing is different in each page.

The image quality judgment section 320 determines the quality of the image laid out in the album by the image layout section 374. For example, the image quality judgment section 320 calculates the spatial frequency of the image laid out in the album by the image layout section 374, and may calculate higher the image quality when the intensity of the calculated spatial frequency is distributed in larger frequency domain. Then, the amount of designing determining section 380 determines that the amount of designing of the album is larger when the image quality calculated by the image quality judgment section 320 is lower. Then, the designing section 384 designs the image laid out in the album by the image layout section 374 in association with the amount of designing determined by the amount of designing determining section 380. Therefore, the album creating apparatus 130 can design variedly the image of which quality is low to obscure the low quality of the image in the album.

The text acquiring section 330 acquires a text used for the album. Additionally, the text acquiring section 330 acquires the title for each page of the album and the text used in each page from the user 180. Here, the text acquiring section 330 may extract a human voice from the sound stored in the sound storage section 366 and analyze the same to acquire the text from the extracted sound. Then, the amount of designing determining section 380 determines the amount of designing depending on the content of the text acquired by the text acquiring section 330.

The amount of designing storage section 382 stores the amount of designing in association with the content of the text. Then, the amount of designing determining section 380 may select the amount of designing stored in the amount of designing storage section 382 in association with the content of the text acquired by the text acquiring section 330. Here, the amount of designing storage section 382 may store the amount of designing in association with various elements to determine the amount of designing, such as the image quality and the kind of object.

Figure 4:
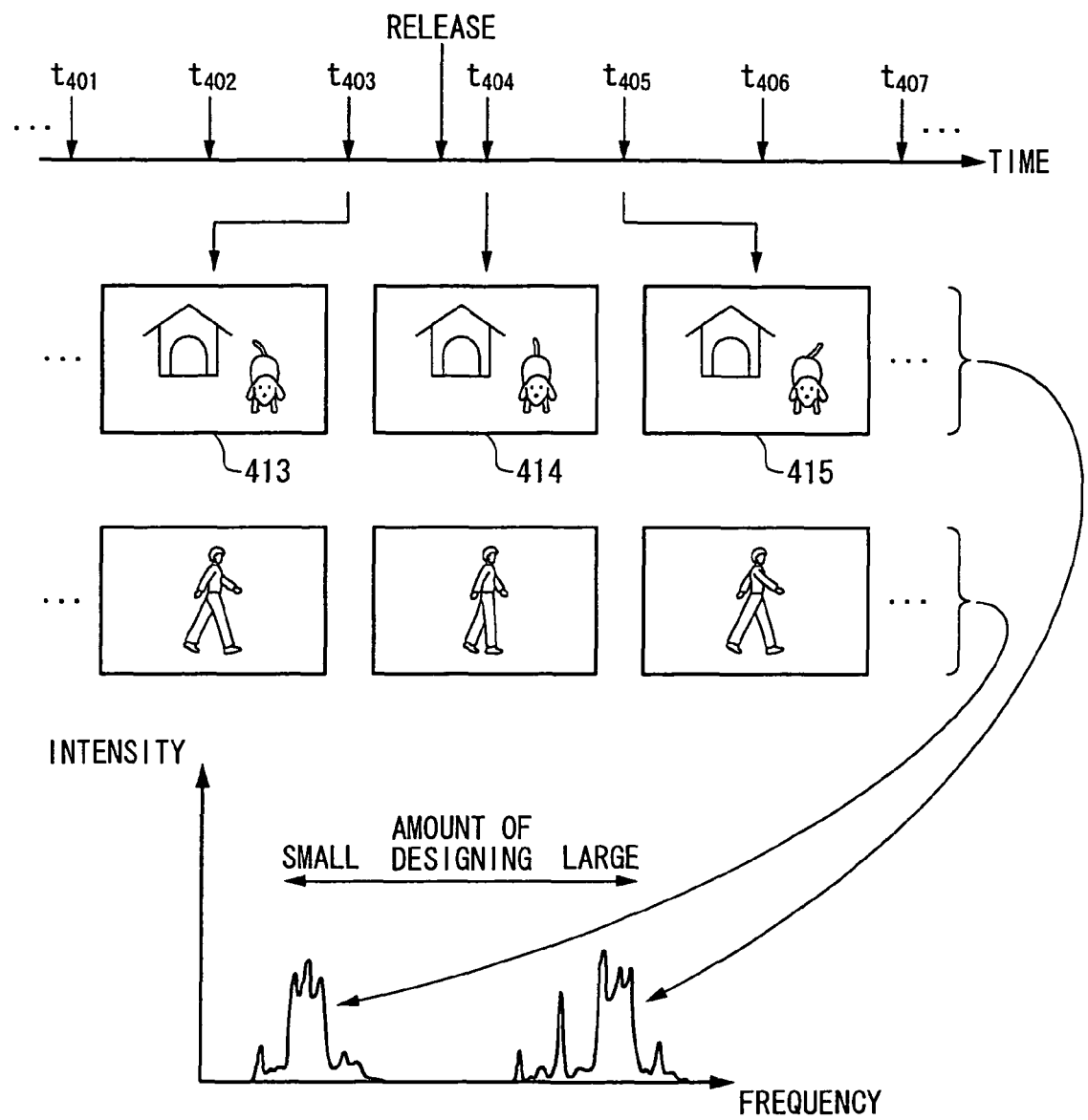
FIG. 4 is an example of a method of setting the amount of designing according to the movement of objects.

FIG. 4 shows an example of a method of setting the amount of designing according to the movement of objects. The image capturing apparatus 100 continuously captures images in terms of time and holds the predetermined number of images which are continuously captured. Then, when the user 180 pushes an release button, the image capturing apparatus 100 acquires an image 414 captured at a time t404 proximate to the time at which the release button is pushed and stores a plurality of images (including 413 and 415) captured at a predetermined period before/after the time t404 (including t404) as moving image information which is the tag information of the image 414 to be stored along with the image 414.

Then, the moving image information storage section 364 acquires the images stored along with the image 414 as the tag information from the image capturing apparatus 100 and stores the same. Then, as for the images stored in the moving image information storage section 364, the object movement calculating section 368 performs an edge extraction on the difference image between the images captured at adjacent times and extracts the outline of the object displaced on the image. For example in FIG. 4, the movement of the tail of the puppy is extracted by the edge extraction because the movement of the tail remains in the difference image. Then, the object movement calculating section 368 calculates the time change of the position of the displaced object on the image and calculates the frequency component of the movement of the object based on the time change of the calculated position.

Then, the amount of designing determining section 380 sets larger the amount of designing to the image having the frequency component of which movement is higher. For example, the amount of designing determining section 380 may determine a coefficient by which the amount of designing is multiplied in proportion to the mean value of the frequency component of movement and multiply the amount of designing stored depending on the kind of the object by the determined coefficient. Thus, the album creating apparatus 130 can more transform the frame of the image on which the puppy wagging the tail is shown than the frame of the image on which the person walking is shown. Therefore, the album creating apparatus 130 can provide the album including the image on which the cuteness of the puppy is enhanced to the user 180.

Figure 5:
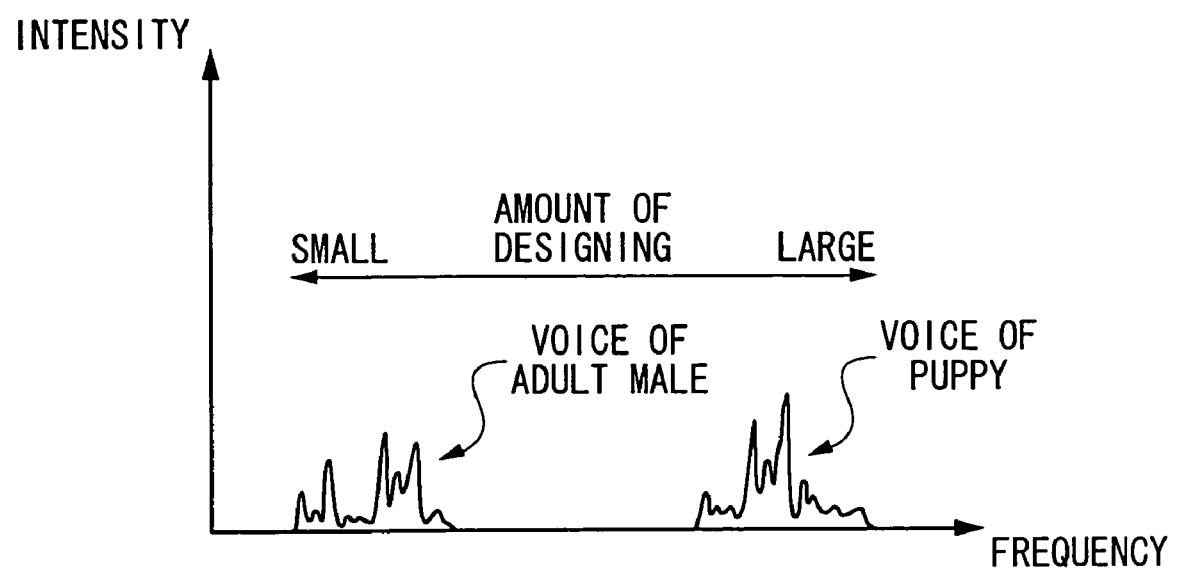
FIG. 5 shows an example of a method of setting the amount of designing according to the sound surrounding an image capturing apparatus 100.

FIG. 5 shows an example of a method of setting the amount of designing according to the sound surrounding the image capturing apparatus 100. The image capturing apparatus 100 continuously record the sound surrounding the image capturing apparatus 100 and holds the sound data continuously recorded for a predetermined period. When the user 180 pushes the release button, the image capturing apparatus 100 stores the sound data recorded for a predetermined period before/after the release button is pushed (including the timing at which the release button is pushed) as tag information captured at the time proximate to the time at which the release button is pushed along with the image. Then, the sound storage section 366 acquires the sound data from the tag information stored along with the image in the image capturing apparatus 100 and stores the same. Then, the amount of designing determining section 380 calculates the frequency component of the sound stored in the sound storage section 366.

Then, the amount of designing determining section 380 sets larger the amount of designing to the image of which frequency component of the sound is higher. For example, the amount of designing determining section 380 may determine a coefficient by which the amount of designing is multiplied and which is proportional to the mean value of the frequency component of the sound and also may determine the value by which the amount of designing stored depending on the kind of objects is multiplied as a new amount of designing. Therefore, the album creating apparatus 130 can automatically transform the frame of the image captured in the place in which the shout of joy of children and a woman's voice are generated. Accordingly, the album creating apparatus 130 can reflect the atmosphere on the image frame when the image is captured by the image capturing apparatus 100.

Here, the sound collection section 104 may have the directivity of sound collecting in the direction substantially same as that of the image capturing apparatus 100. Therefore, the album creating apparatus 130 can set the amount of designing depending on the sound from the subject.

Figure 6:
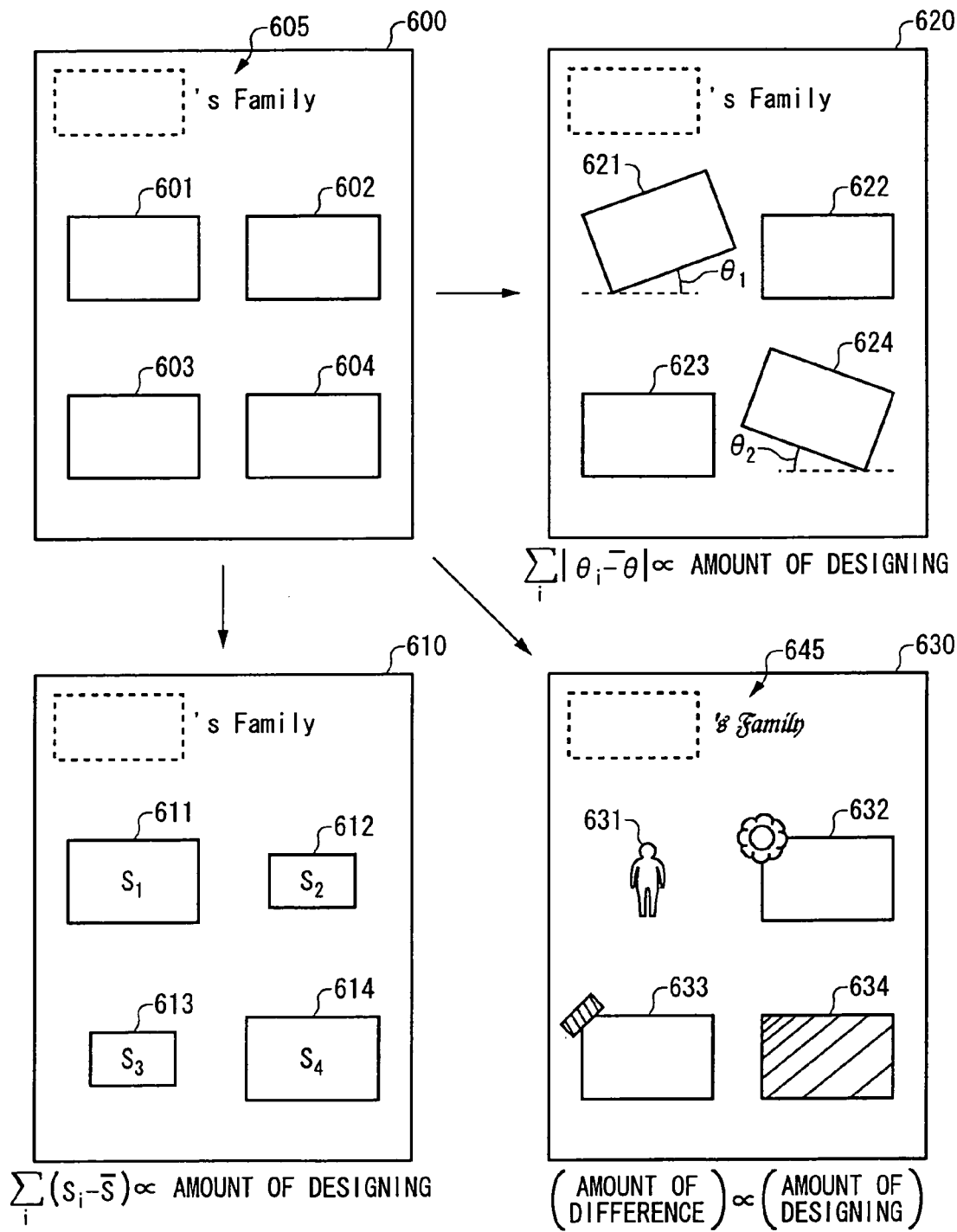
FIG. 6 shows another example of designing by the album creating apparatus 130.

FIG. 6 is another example of designing by the album creating apparatus 130. The album template storage section 376 stores image frames 601-604 and a text 605 as a base template to create an album. The album creating apparatus 130 variously designs images to be fitted into the base template 600 stored in the album template storage section 376 to create an album.

Specifically, the designing section 384 creates a template 610 which is designed by increasing the variation of the area of image frames based on the amount of deigning determined by the amount of designing determining section 380. Specifically, the designing section 384 calculates the difference between the area for each of the image frames 611-614 and the average area of the image frames 611-614 and determines that the total value of the difference is the amount of variation of the area. Then, the designing section 384 creates image frames 611-614 with the amount of variation of the area in proportion to the amount of designing determined by the amount of designing determining section 380.

Additionally, the designing section 384 creates a template 620 which is designed by increasing the variation of rotating angle of the image frame depending on the amount of designing determined by the amount of designing determining section 380. Specifically, the designing section 384 calculates the difference between the rotating angle of each of the image frames 621-624 and the average rotating angle and determines that the total value of the difference is the variation of the rotating angle. Then, the designing section 384 creates image frames 621-624 with the variation of the rotating angle in proportion to the amount of designing determined by the amount of designing determining section 380.

Additionally, the designing section 384 generates image frames 641-644 which are designed by performing image processing on images laid out in the image frames 601-604 according to the amount of designing determined by the amount of designing determining section 380. Specifically, the designing section 384 performs trimming processing on the image laid out in the image frames 601. In this case, the designing section 384 calculates the difference between the area of the image after trimming and the area of the image before trimming (note: the area of the image which has been trimmed) as the amount of change of the image area. Then, the designing section 384 generates an image 641 which has been trimmed with the amount of change of the image area in proportion to the amount of designing determined by the amount of designing determining section 380.

Additionally, the designing section 384 performing a processing to add an object to the image laid out in the image frame 602. In this case, the designing section 384 calculates the difference of the luminance value of pixels between the image to which the object is added and the original image or the difference of the luminance value for each color as the amount of difference of the images. Then, the designing section 384 generates an image 642 to which the object with the amount of difference of the image in proportion to the amount of designing determined by the amount of designing determining section 380 is added.

Additionally, the designing section 384 may perform various image processing such as gradation processing on the image laid out in each of the image frames 601-604. Then, the designing section 384 may generate the image which has undergone the image processing with the amount of difference in proportion to the amount of designing determined by the amount of designing determining section 380.

The designing section 384 may design by changing the decoration of the text 605 defined in the template 600. Specifically, the designing section 384 changes the font of a text 645 in a template 640 to a font with the decoration level depending on the amount of designing. Here, the decoration level is the amount of difference from the reference font (the font of the text 605). The designing section 384 previously stores the font in association with the amount of designing determined by the amount of designing. Here, the designing section 384 may design the text 605 by applying the font stored therein in association with the amount of designing determined by the amount of designing determining section 380.

Figure 7:
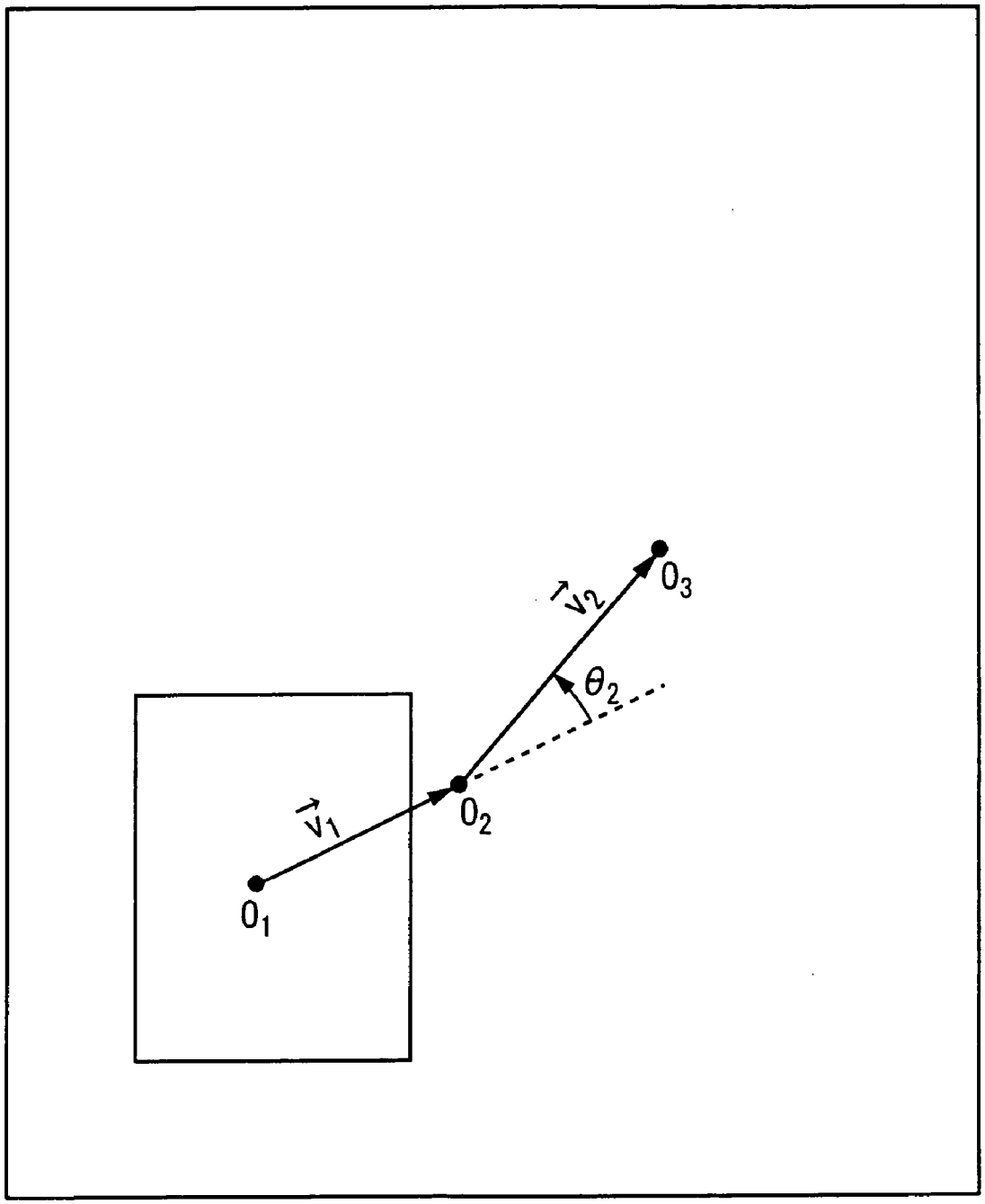
FIG. 7 shows an example of designing in an electronic album.

FIG. 7 is an example of designing in an electronic album. Creating an electronic album, the album creating apparatus 130 can design the movement of images in addition to the above-described designing. For example, when the album template storage section 376 stores movement information indicating that the image is moved uniformly and linearly (e.g. movement information on the image frame), the designing section 384 adds the amount of change of the acceleration in proportion to the amount of designing determined by the amount designing determining section 380 to the uniform linear movement. Here, the amount of change of the acceleration may be a value obtained by weighting with the amount of variation in the direction to which the image is moved per hour and the amount of change of the speed per hour and adding them each other. Additionally, when the album creating apparatus 130 creates an electronic album, the designing section 384 can change the various amount of change due to temporally changing the image such As the amount of temporal change of luminance or color in the image according to the amount of designing determined by the amount of designing determining section 380.

As described above, the designing section 384 can variously design with the transformation of the image frame, the variation of the area and the angle of the image frame, the image processing and the movement of the image according to the amount of designing determined by the amount of designing determining section 380.

FIG. 8 shows an example of the amount of designing stored in an amount of designing storage section 382. The amount of designing storage section 382 stores the amount of designing in association with the content of text. Then, the amount of designing determining section 380 selects the amount of designing according to the content of the text acquired by the text acquiring section 330 from the amount of designing storage section 382. Accordingly, the large amount of designing is previously determined for mimetic words such as "Gack" and "smoothly", and a Japanese unique term "chan" as a kind of nickname which is added to the end of an infant's or girl's name such as "Hanako-chan", so that the album creating apparatus 130 can create an album with the amount of designing which is matched with the impression on the viewer by the inputted text.

Here, it has been described that the amount of designing storage section 382 stores the amount of designing according to the content of designing with reference to FIG. 8. Additionally, the amount of designing storage section 382 may store the amount of designing in association with a plurality of indexes such as the kind of object, the movement of object and decorated image quality. Then, the amount of designing determining section 380 may determine the total value of the amount of designing stored in the amount of designing storage section 382 in association with each of the plurality of indexes to determine the designing as the amount of designing necessary to design and provide the same to the designing section 384.

Figure 9:
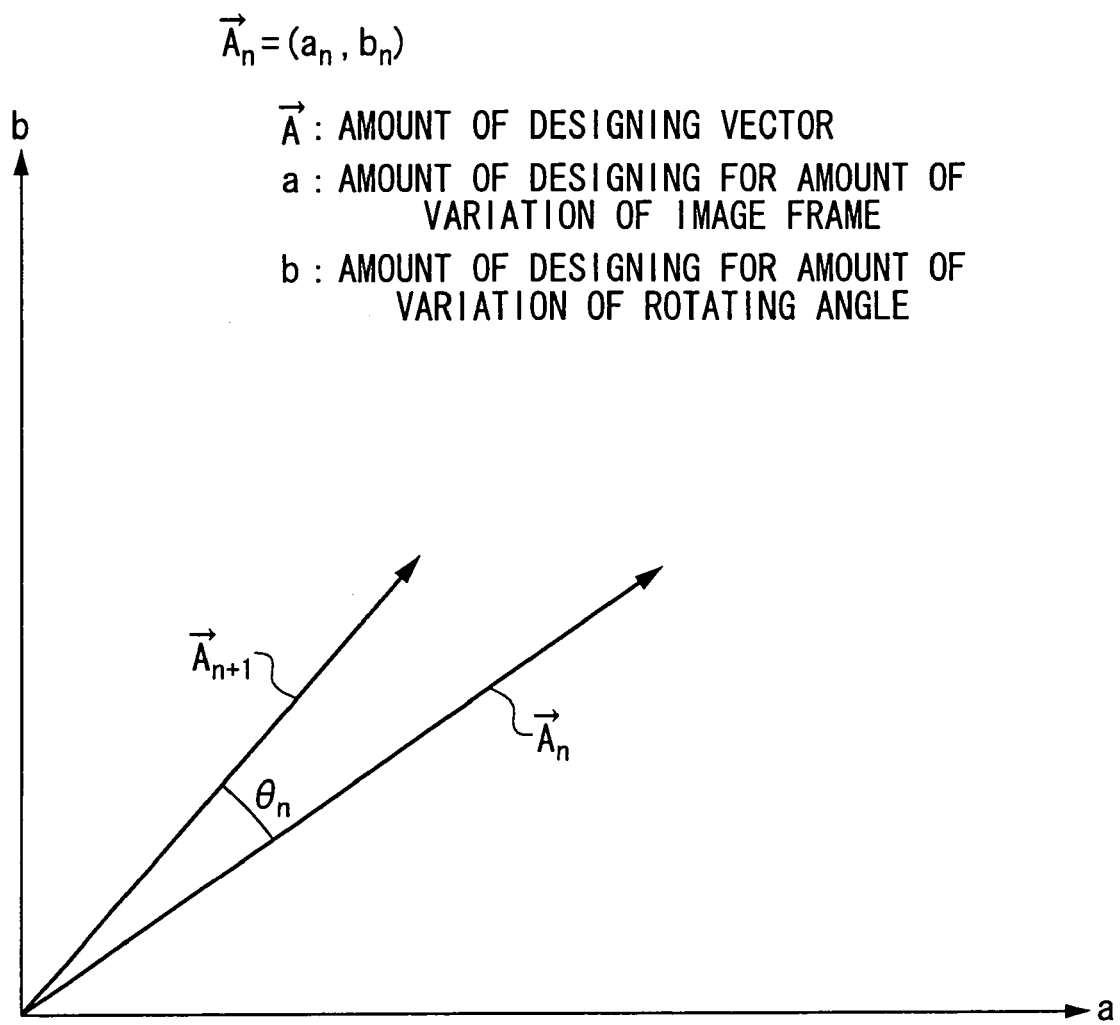
FIG. 9 shows an example of an amount of designing vector.

FIG. 9 shows an example of an amount of designing vector with the size depending on the direction of designing and the amount of designing. The designing section 384 allocates the amount of designing determined by the amount of designing determining section 380 to each kind of above-described designing such as the transformation of the image frame, the variation of the area and the angle of the image frame, the image processing and the movement of the image. At this time, the amount of designing determining section 384 allocates such that the total value of the amount of designing allocated to each kind of designing is equal to the amount of designing determined by the amount of designing determining section 380. Therefore, the designing section 384 has the magnitude of the amount of designing determined by the amount of designing determining section 380 and generates the amount of designing vector composed of the amount of designing allocated to each kind of designing.

Now, it will be briefly described that a method of determining the amount of designing vector using a two-dimensional amount of designing vector composed of the amount of designing for the variation of the area of image frame and the amount of designing for the variation of the angle of image frame. The designing section 384 calculates the amount of designing vector for each page of the album. Here, the amount of designing vector in a page n-th is $A_n$, for example. When the designing section 384 determines an amount of designing vector $A_{n+1}$ which is in a page n+1-th following the page n-th, the designing section 384 defines the amount of designing vector $A_{n+1}$ such that the amount of change such as the magnitude of 0 in the vector direction indicated by the amount of designing vector $A_n$ is less than a predetermined amount of change. Thereby it can be prevented from creating an album with the design completely different between continuous pages.

Here, when the designing section 384 determines the amount of designing vector $A_{n+1}$ in the page n-th, the designing section 384 calculates the difference between the amount of difference in the page n+1-th determined by the amount of designing determining section 380 and the amount of designing in the page n-th. Then, when the difference of the calculated amount of designing is larger, the designing section 384 may determine the amount of designing vector $A_{n+1}$ having the angle closer to that of the amount of designing vector $A_n$. Here, the page may be a facing page or one-half of the facing page. Additionally, the page in an electronic album may be a display region on the display device, which can be viewed by the viewer at once.

As described above, the album creating system 170 can automatically transform the image frame into which the image is fitted by the appropriate amount depending on the kind and the gesture of the subject shown in the image to be stored in the album and the characteristic of the sound captured with the image. Therefore, the user 180 easily create the album in which the characteristic of the image is more enhanced using the album creating system 170.

Figure 10:
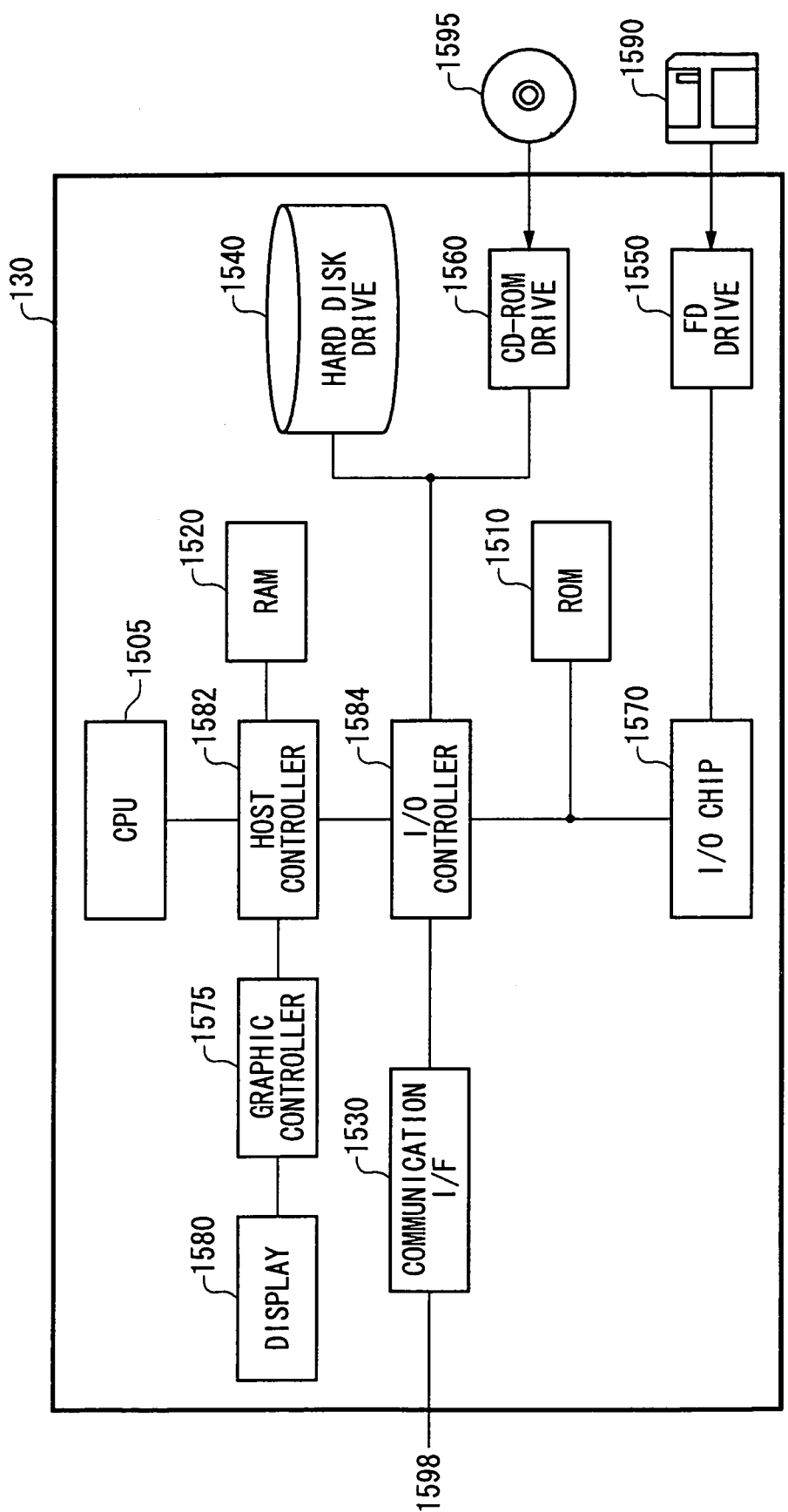
FIG. 10 shows an example of the hardware configuration of the album creating apparatus 130.

FIG. 10 shows an example of the hardware configuration of the album creating apparatus 130. A computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame shape buffer provided in the RAM 1520 by the CPU 1505 and displays the same on the display 1580. Alternatively, the graphic controller 1575 may include therein a frame shape buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505 in the computer 1500. The communication interface 1530 communicates with the album creating apparatus 130 through a network and provides the program or data to the album creating apparatus 130. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface through the RAM 1520 is stored in a recording medium, such as the flexible disk 1590, the CD-ROM 1595, or an IC card and provided by the user. The program is read from the recording medium, provided to the communication interface 1530 through the RAM 1520 and transmitted to the album creating apparatus 130 through the network. The program transmitted to the album creating apparatus 130 is installed in the album creating apparatus and executed therein.

The program installed in the album creating apparatus 130 and executed therein operates the album creating apparatus 130 to function as the image storage section 304, the moving image information storage section 364, the sound storage section 366, the object movement calculating section 368, the object identifying section 372, the image layout section 374, the album template storage section 376, the album template selecting section 378, the amount of designing determining section 380, the amount of designing storage section 382, the designing section 384, the image quality determining section 320 and the text acquiring section 330 which are described with reference to FIG. 1-5.

The above-described programs may be stored in an external storage medium. The external recording medium may be, in addition to the flexible disk 1590 and the CD-ROM 1595, an optical storage medium such as a DVD and a PD, a magneto-optical recording medium such as a MD, a tape medium and a semiconductor memory such as an IC card. Additionally, a storage medium such as a hard disk or a RAM which is provided in the server system connected to a private communication network or Internet is used as the recording medium to provide the program to the computer 1500 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album creating method comprising:
   storing a plurality of images;
   laying out the images stored in the image storing step into an album;
   determining the amount of designing in the album depending on the kind of object included in the image laid out in the image laying out step; and
   designing a frame shape of the image laid out in the album in the laying out step in association with the amount of designing determined in the amount of designing determining step,
   further comprising storing sound captured with the plurality of images in association with each of the images, wherein
   the amount of designing determining step determines the amount of designing depending the kind of the object included in the image laid out in the album by the image layout step based on the sound stored,
   wherein the amount of designing determining step determines the amount of designing according to the frequency of the sound stored.

2. A non-transitory computer readable medium including a program for an album creating apparatus for creating an album, the program operates the album creating apparatus to function as:
   an image storage section for storing a plurality of images;
   an image layout section for laying out the images stored in the image storage section into an album;
   an amount of designing determining section for determining the amount of designing in the album depending on the kind of object included in the image laid out by the image layout section; and
   a designing section for designing a frame shape of the image laid out in the album by the image layout section in association with the amount of designing determined by the amount of designing determining section,
   further comprising a sound storage section for storing the sound captured with the plurality of images stored in the image storage section in association with each of the images, wherein
   the amount of designing determining section determines the amount of designing depending the kind of the object included in the image laid out in the album by the image layout section based on the sound stored in the sound storage section,
   wherein the amount of designing determining section determines the amount of designing according to the frequency of the sound stored in the sound storage section.

3. An album creating apparatus comprising:
   a processor
   an image storage section for storing a plurality of images;
   an image layout section for laying out the images stored in the image storage section into an album;
   an amount of designing determining section for determining the amount of designing in the album depending on the kind of object included in the image laid out by the image layout section; and
   a designing section for designing a frame shape of the image laid out in the album by the image layout section in association with the amount of designing determined by the amount of designing determining section;
   further comprising a sound storage section for storing the sound captured with the plurality of images stored in the image storage section in association with each of the images,
   wherein the amount of designing determining section determines the amount of designing depending the kind of the object included in the image laid out in the album by the image layout section based on the frequency of the sound stored in the sound storage section.

4. An album creating method comprising:
   storing a plurality of images;
   laying out the images stored in the image storing step into an album;
   determining the amount of designing in the album depending on the kind of object included in the image laid out in the image laying out step; and
   designing a frame shape of the image laid out in the album in the laying out step in association with the amount of designing determined in the amount of designing determining step,
   further comprising:
   storing at least one of the moving image information before the image is captured and the moving image information after the image is captured in association with each of the plurality of images stored;
   calculating movement of an object included in the image laid out in the album by the image layout step based on the moving image information, wherein
   the amount of designing determining step determines the amount of designing according to the movement of the object calculated by the object movement calculating step; and
   wherein the amount of designing determining step determines the amount of designing in the album according to the frequency of the movement of the object calculated by the object movement calculating step.

5. A non-transitory computer readable medium including a program for an album creating apparatus for creating an album, the program operates the album creating apparatus to function as:
   an image storage section for storing a plurality of images;
   an image layout section for laying out the images stored in the image storage section into an album;
   an amount of designing determining section for determining the amount of designing in the album depending on the kind of object included in the image laid out by the image layout section; and
   a designing section for designing a frame shape of the image laid out in the album by the image layout section in association with the amount of designing determined by the amount of designing determining section,
   further comprising:
   a moving image information storage section for storing at least one of the moving image information before the image is captured and the moving image information after the image is captured in association with each of the plurality of images stored in the image storage section;
   an object movement calculating section for calculating the movement of an object included in the image laid out in the album by the image layout section based on the moving image information stored in the moving image information storage section, wherein the amount of designing determining section determines the amount of designing according to the movement of the object calculated by the object movement calculating section; and wherein the amount of designing determining section determines the amount of designing in the album according to the frequency of the movement of the object calculated by the object movement calculating section.

6. An album creating apparatus comprising:

a processor;

an image storage section for storing a plurality of images;

an image layout section for laying out the images stored in the image storage section into an album;

an amount of designing determining section for determining the amount of designing in the album depending on the kind of object included in the image laid out by the image layout section; and a designing section for designing a frame shape of the image laid out in the album by the image layout section in association with the amount of designing determined by the amount of designing determining section, a moving image information storage section for storing at least one of the moving image information before the image is captured, and the moving image information after the image is captured in association with each of the plurality of images stored in the image storage section;

an object movement calculating section for calculating the movement of an object included in the image laid out in the album by the image layout section based on the moving image information stored in the moving image information storage section, wherein the amount of designing determining section determines the amount of designing according to the frequency of the movement of the object calculated by the object movement calculating section.

7. An album creating method comprising:

storing a plurality of images;

laying out the images stored in the image storing step into an album;

judging the quality of the image laid out in the album in the image laying out step;

determining that the amount of designing according to the image quality calculated in the image quality judging step; and designing the image laid out in the album in the image laying out step in association with the amount of designing determined in the amount of designing determining step, further comprising:

storing at least one of the moving image information before the image is captured and the moving image information after the image is captured in association with each of the plurality of images;

calculating movement of an object included in the image laid out in the album by the image layout step based on the moving image information stored in the moving image information storage step, wherein the amount of designing determining step determines the amount of designing according to the movement of the object calculated by the object movement calculating step; and wherein the amount of designing determining step determines the amount of designing in the album according to the frequency of the movement of the object calculated by the object movement calculating step.

8. A non-transitory computer readable medium including a program for an album creating apparatus for creating an album, the program operates the album creating apparatus to function as:

an image storage section for storing a plurality of images;

an image layout section for laying out the images stored in the image storage section into an album;

an image quality judgment section for judging the quality of the image laid out in the album by the image layout section;

an amount of designing determining section for determining the amount of designing according to the image quality calculated by the image quality judgment section; and a designing section for designing the image laid out in the album by the image layout section in association with the amount of designing determined by the amount of designing determining section, and further comprising:

a moving image information storage section for storing at least one of the moving image information before the image is captured and the moving image information after the image is captured in association with each of the plurality of images stored in the image storage section;

an object movement calculating section for calculating the movement of an object included in the image laid out in the album by the image layout section based on the moving image information stored in the moving image information storage section, wherein the amount of designing determining section determines the amount of designing according to the movement of the object calculated by the object movement calculating section; and wherein the amount of designing determining section determines the amount of designing in the album according to the frequency of the movement of the object calculated by the object movement calculating section.

9. An album creating apparatus comprising:

a processor;

an image storage section for storing a plurality of images;

an image layout section for laying out the images stored in the image storage section into an album;

an image quality judgment section for judging the quality of the image laid out in the album by the image layout section;

an amount of designing determining section determines the amount of designing according to the image quality calculated by the image quality judgment section; and a designing section for designing the image laid out in the album by the image layout section in association with the amount of designing determined by the amount of designing determining section, further comprising:

a moving image information storage section for storing at least one of the moving image information before the image is captured and the moving image information after the image is captured in association with each of the plurality of images stored in the image storage section;

an object movement calculating section for calculating the movement of an object included in the image laid out in the album by the image layout section based on the moving image information stored in the moving image information storage section, wherein the amount of designing determining section determines the amount of designing according to the movement of the object calculated by the object movement calculating section; and wherein the amount of designing determining section determines the amount of designing in the album according to the frequency of the movement of the object calculated by the object movement calculating section.

10. An album creating method comprising:

storing a plurality of images;

laying out the images stored in the image storing step into an album;

judging the quality of the image laid out in the album in the image laying out step;

determining that the amount of designing according to the image quality calculated in the image quality judging step; and designing the image laid out in the album in the image laying out step in association with the amount of designing determined in the amount of designing determining step, further comprising storing sound captured with the plurality of images stored in association with each of the images, wherein the amount of designing determining step determines the amount of designing depending the kind of the object included in the image laid out in the album by the image layout step based on the sound stored, wherein the amount of designing determining step determines the amount of designing according to the frequency of the sound stored.

11. A non-transitory computer readable medium including a program for an album creating apparatus for creating an album, the program operates the album creating apparatus to function as:

an image storage section for storing a plurality of images;

an image layout section for laying out the images stored in the image storage section into an album;

an image quality judgment section for judging the quality of the image laid out in the album by the image layout section;

an amount of designing determining section for determining the amount of designing according to the image quality calculated by the image quality judgment section; and a designing section for designing the image laid out in the album by the image layout section in association with the amount of designing determined by the amount of designing determining section, and further comprising a sound storage section for storing the sound captured with the plurality of images stored in the image storage section in association with each of the images, wherein the amount of designing determining section determines the amount of designing depending the kind of the object included in the image laid out in the album by the image layout section based on the sound stored in the sound storage section, wherein the amount of designing determining section determines the amount of designing according to the frequency of the sound stored in the sound storage section.

12. An album creating apparatus comprising:

a processor;

an image storage section for storing a plurality of images;

an image layout section for laying out the images stored in the image storage section into an album;

an image quality judgment section for judging the quality of the image laid out in the album by the image layout section;

an amount of designing determining section determines the amount of designing according to the image quality calculated by the image quality judgment section; and a designing section for designing the image laid out in the album by the image layout section in association with the amount of designing determined by the amount of designing determining section, further comprising a sound storage section for storing the sound captured with the plurality of images stored in the image storage section in association with each of the images, wherein the amount of designing determining section determines the amount of designing depending the kind of the object included in the image laid out in the album by the image layout section based on the sound stored in the sound storage section, wherein the amount of designing determining section determines the amount of designing according to the frequency of the sound stored in the sound storage section.

* * * * *